US008160336B2

(12) United States Patent
Liang et al.

(10) Patent No.: US 8,160,336 B2
(45) Date of Patent: Apr. 17, 2012

(54) REDUCING FALSE POSITIVES FOR AUTOMATIC COMPUTERIZED DETECTION OF OBJECTS

(75) Inventors: Jianming Liang, Paoli, PA (US); Zhiyun Xue, Bethlehem, PA (US); Marcos Salganicoff, Philadelphia, PA (US); Matthias Wolf, Coatesville, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1162 days.

(21) Appl. No.: 11/516,213

(22) Filed: Sep. 6, 2006

(65) Prior Publication Data

US 2007/0058870 A1 Mar. 15, 2007

Related U.S. Application Data

(60) Provisional application No. 60/716,843, filed on Sep. 14, 2005.

(51) Int. Cl.
*G06K 9/00* (2006.01)
(52) U.S. Cl. .......................................... 382/131; 382/128
(58) Field of Classification Search .................... 382/190
See application file for complete search history.

(56) References Cited

U.S. PATENT DOCUMENTS

| 2003/0035507 A1* | 2/2003 | Hsu et al. ........................... 378/4 |
| 2003/0174873 A1* | 9/2003 | Giger et al. .................... 382/128 |
| 2003/0176780 A1* | 9/2003 | Arnold et al. ................. 600/407 |

OTHER PUBLICATIONS

Zhimin Huo, Maryellen L. Giger, Carl J. Vyborny, Ulrich Bick, Ping Lu, Dulcy E. Wolverton, and Robert A. Schmidt, "Analysis of spiculation in the computerized classification of mammographic masses," Med. Phys. 22, 1569 (1995).*

Atilla P. Kiraly, Eric Pichon, David P. Naidich, and Carol L. Novak, "Analysis of arterial subtrees affected by pulmonary emboli," Proc. SPIE 5370, 1720 (Feb. 16, 2004).*
Masutani, Y.; MacMahon, H.; Doi, K.; , "Computerized detection of pulmonary embolism in spiral CT angiography based on volumetric image analysis," Medical Imaging, IEEE Transactions on , vol. 21, No. 12, pp. 1517-1523, Dec. 2002.*
Z. Huo, M.L. Giger, C.J. Vyborny, U. Bick, P. Lu, D.E. Wolverton, R.A. Schmidt, Analysis of Spiculation in the Computerized Classification of Mammographic Masses, Medical Physics, vol. 22, No. 10, 1995, pp. 1569-1579.*
R. Sebbe, "Computer-aided Diagnosis of Pulmonary Embolism in Opacified CT Images," PhD thesis, Faculte Polytechnique de Mons, Feb. 2007. http://tcts.fpms.ac.be/publications/phds/sebbe/sebbe_thesis-1.0.5.pdf.*
Masutani et al., "Computerized Detection of Pulmonary Embolism in Spiral CT Angiography Based on Volumetric Image Analysis", IEEE Transactions on Medical Imaging, IEEE Service Center, Piscataway, NJ, vol. 21, No. 12, Dec. 2002, pp. 1517-1523.
Barrett et al., "Interactive Live-Wire Boundary Extraction", Medical Image Analysis, Oxford University Press, Oxford, GB, vol. 1, No. 4, 1997, pp. 1-19.
Kiraly et al., "Analysis of arterial sub-trees affected by Pulmonary Emboli", SPIE Medical Imaging 2004: Image Processing, Proceedings of SPIE vol. 5370, 2004, pp. 1720-1729.

* cited by examiner

*Primary Examiner* — Stephen R Koziol
*Assistant Examiner* — Nirav G Patel
(74) *Attorney, Agent, or Firm* — Peter Withstandley

(57) ABSTRACT

A computer-implemented method for identifying an object of interest includes providing input data including an image and a candidate for the object of interest in the image, extracting a boundary of the candidate, and extracting a segment of a region of interest containing the candidate. The method further includes determining a plurality of features of an extracted segment of the region of interest containing the candidate, and outputting the object of interest, wherein the object of interest is characterized by the plurality of features, wherein the object of interest and the plurality of features are stored as computer-readable code.

18 Claims, 4 Drawing Sheets

REDUCING FALSE POSITIVES FOR AUTOMATIC COMPUTERIZED DETECTION OF OBJECTS

This application claims the benefit of Provisional Application No. 60/716,843 filed on Sep. 14, 2005 in the United States Patent and Trademark Office, the contents of which are herein incorporated by reference in its entirety.

BACKGROUND OF THE INVENTION

1. Field of the Invention

The present disclosure relates to image processing, and more particularly to a system and method for detecting an object in an image while eliminating false positive detections.

2. Description of Related Art

The pulmonary embolism (PE) is defined as a thrombus, which is generally recognized as dark regions within enhanced pulmonary arteries in computed tomography angiography (CTA) images. For PE detection, it is difficult to distinguish PE from various PE look-alikes (false positives) including flow voids in veins and arteries, lymphoid tissues, streak artifacts near superior vena cava, partial volume artifacts at vascular bifurcations, etc.

Therefore, a need exists for a system and method for object detection including a feature based approach for automatically removing the false positives, while preserving the true positives.

SUMMARY OF THE INVENTION

According to an embodiment of the present disclosure, a computer-implemented method for identifying an object of interest includes providing input data including an image and a candidate for the object of interest in the image, extracting a boundary of the candidate, and extracting a segment of a region of interest containing the candidate. The method further includes determining a plurality of features of an extracted segment of the region of interest containing the candidate, and outputting the object of interest, wherein the object of interest is characterized by the plurality of features, wherein the object of interest and the plurality of features are stored as computer-readable code.

The region of interest is a vessel, and the object of interest is a pulmonary embolism.

Extracting the segment of the region of interest includes seeding the segment extraction using the boundary and growing the boundary.

Extracting the segment of the region of interest comprises providing the region of interest having a fixed size.

Providing the input data includes providing the candidate as a plurality of voxels, providing a value for stopping a region growing as a maximum distance between a voxel and the boundary of the candidate, and providing a threshold for an intensity of the voxel.

According to an embodiment of the present disclosure, a computer-implemented method for identifying an object of interest includes providing input data including an image and a candidate for the object of interest in the image, extracting a boundary of the candidate according to a set of neighbors of each voxel of the candidate, extracting a segment of a region of interest containing the candidate based on the boundary by determining a minimum cumulative cost path map of the boundary, determining a plurality of features of an extracted segment of the region of interest containing the candidate, and outputting the object of interest, wherein the object of interest is characterized by the plurality of features, wherein the object of interest and the plurality of features are stored as computer-readable code.

Outputting the object of interest further includes comparing the plurality of features to a known set of features, and verifying the object of interest based on the comparison. Outputting the object of interest further includes classifying the candidate as a false positive or a true positive based on the plurality of features.

According to an embodiment of the present disclosure, a program storage device is provided readable by machine, tangibly embodying a program of instructions executable by the machine to perform method steps for identifying an object of interest. The method steps includes providing input data including an image and a candidate for the object of interest in the image, extracting a boundary of the candidate, and extracting a segment of a region of interest containing the candidate. The method further includes determining a plurality of features of an extracted segment of the region of interest containing the candidate, and outputting the object of interest, wherein the object of interest is characterized by the plurality of features, wherein the object of interest and the plurality of features are stored as computer-readable code.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a feature-based system and method substantially eliminates false positives in automatic Pulmonary Embolism detection, including vessel segment extraction and feature calculation.

Figure 1A:
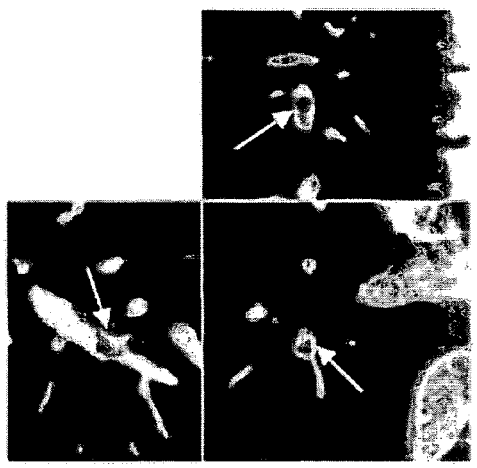
FIG. 1A-C illustrate a difference between a vessel containing a PE and a vessel containing a PE false positive (FP) according to an embodiment of the present disclosure.
Figure 1B:
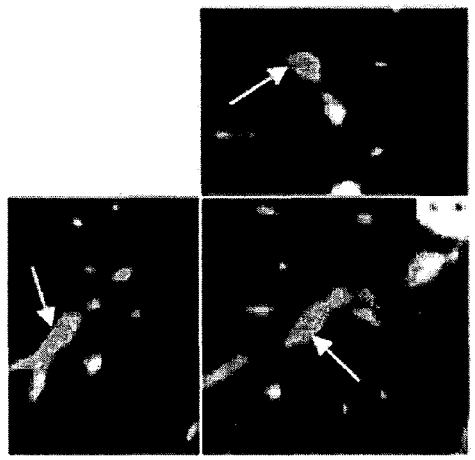
Figure 1C:
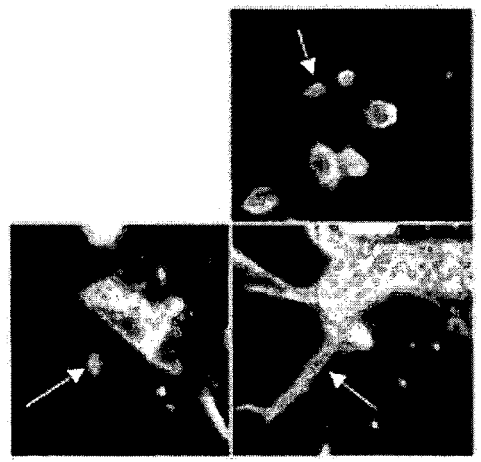
Figure 2:
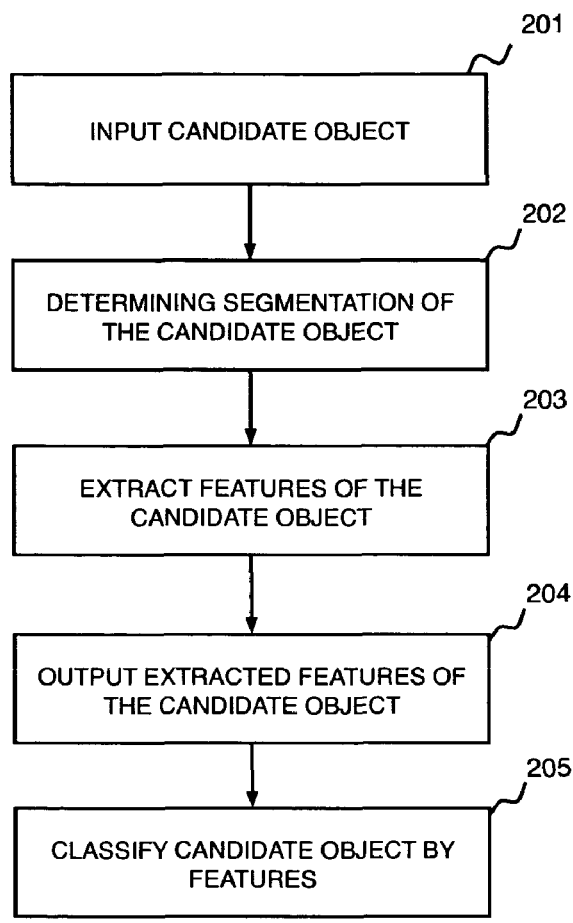
FIG. 2 is a flow chart of a method for extracting an object of interest according to an embodiment of the present disclosure.

FIG. 1A-C show CT images for the PE detection. FIG. 1A shows a true PE in an artery, FIG. 1B shows an PE FP in a vein, and FIG. 1C shows a PE FP in an artery. The texture and intensity of the vessel surrounding the true PE (FIG. 1A) are different from those of the vessel surrounding the FPs. A system and method according to an embodiment of the present invention exploits vessel characteristics to differentiate the true PEs from the false positives. Referring to FIG. 2, the approach is a vessel-based approach, wherein, given one PE candidate 201, a segment of vessel containing the candidate is extracted 202. Given the extracted candidate, features based on the extracted vessel segment are extracted 203, so that these extracted features may be utilized by other modules, for example, a classifier, to identify the candidate as a true PE or a non-PE object.

Figure 3:
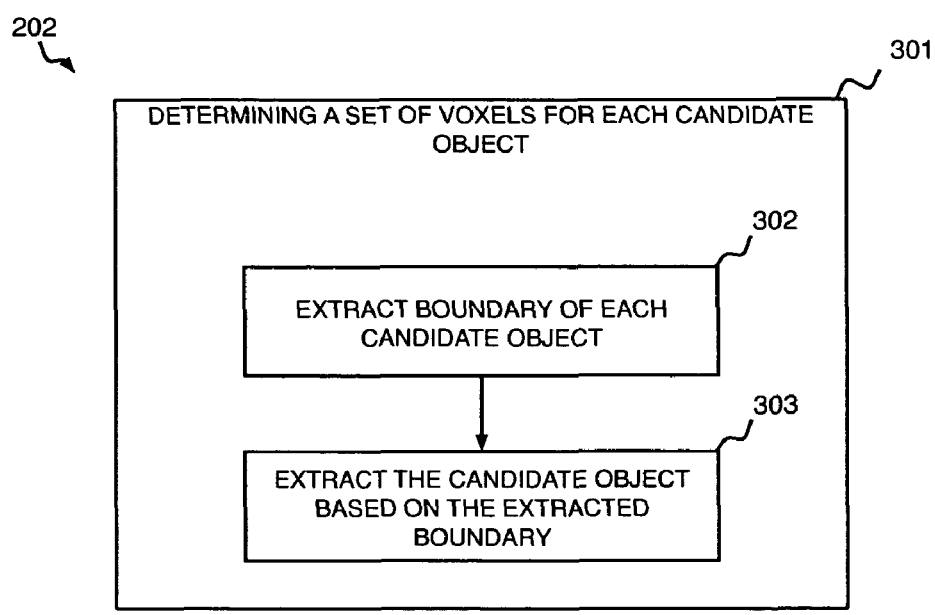
FIG. 3 is a flow chart of a method for extracting an object of interest according to an embodiment of the present disclosure.

Referring to FIG. 3 and the vessel extraction 203; each potential PE is given by a set of voxels 301, also referred to as candidate, component or candidate component. Block 301 includes two parts: candidate boundary extraction 302 and vessel segment extraction 303. The boundary points of the PE candidate component are set as seed points in the vessel segmentation 303. There are a various approaches that may be used for extracting the boundary, for example, edge detection, derivatives, or dilate the PE candidate and then subtract the PE candidate from the dilated PE candidate. In detail, for example, the boundary is obtained by checking the neighbors of each voxel of the PE candidate component. If all of its neighbors belong to the component, then the voxel is not on the boundary. If any of its neighbors does not belong to the component, then the voxel is on the boundary and is recorded.

After boundary extraction 302, a neighboring segment of the vessel is extracted that contains the candidate component. There are various approaches that may be applied. For example, vessel segment extraction 303, which is based on using a graph-searching method to create a minimum cumulative cost path map. Here the cost is the Euclidean distance from the boundary of the candidate component.

The graph search vessel extraction 302 method may be written as follows: Input (see FIG. 2, block 201):

| | |
|---|---|
| c | [Voxels in one PE candidate component] |
| MaxDistance | [Value for stopping the region growing (the maximum distance between a vessel voxel and the boundary of the candidate component] |
| ThreshIntensity | [Threshold for the intensity of the vessel] |
| Data Structures: | |
| s | [Seed voxels (boundary points of the candidate component)] (see Figure 3, block 303) |
| Q | [Priority queue of active voxels sorted by total cost] |
| N(q) | [Neighborhood set of voxel q (contains 26 neighbors of the voxel)] |
| C(q) | [Total cost function from seed points to q] |
| E(q) | [Boolean function indicating if q has been processed] |
| Outputs (see Figure 2, block 204): | |
| p | [Pointers from each voxel indicating the minimum cost path] |
| t | [List of voxels on extracted vessel segment] |
| Exemplary Algorithm: | |
| s ← boundary(c) | [Get the boundary voxels of the component (seed voxels)] |
| E(c \ s) ← TRUE | [Mark all the voxels inside the component as processed (do not process the voxels inside the component)] |
| C(s) ← 0, Q ← s | [Initialize the priority queue with zero cost seed voxels] |
| while Q ≠ φ do | [While the queue is not empty:] |
|    q ← min(Q) | [Remove minimum cost voxel from the queue] |
|    if C(q) ≧ MaxDistance | |
|      break; | [Stop growing if it reaches the maximum cost (maximum length of vessel)] |
|    end | |
|    if q ∉ s | [If q is not on the boundary of component] |
|      t ← q; | [Add q to the list of vessel points] |
|    end | |
|    E(Q) ← TRUE | Mark q as processed] |
|    for each voxel r ∉ N(q) | |
|      if intensity (r) ≧ ThreshIntensity | [Assume the intensity of vessel is not less than the threshold] |
|        $C_{current}$ ← C(q) + d(q) | [Calculate the current total cost to neighbor] |
|        if r ∉ Q and Ccurrent < C(r) | |
|          r ← Q | [Remove higher cost neighbors from queue] |
|        end | |
|        if r ∉ Q, | [If neighbor is not in the queue] |
|          C(r) ← $C_{current}$ | [Assign neighbor's total cost] |
|          p(r) ← q | [Set back pointer] |
|          Q ← r | [Put neighbor into the queue] |
|        end | |
|      end | |
|    end | |
| end | |

Figure 4:
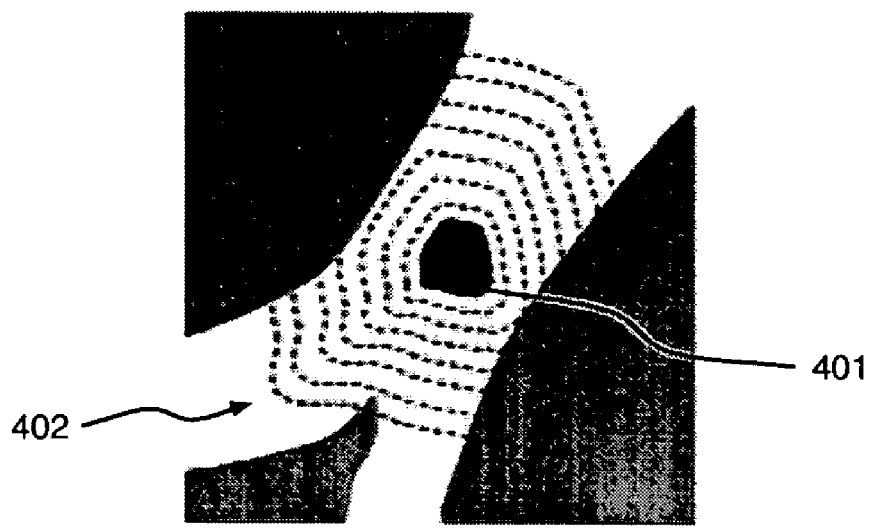
FIG. 4 is an illustration of a method for extracting an object of interest according to an embodiment of the present disclosure.
Figure 5:
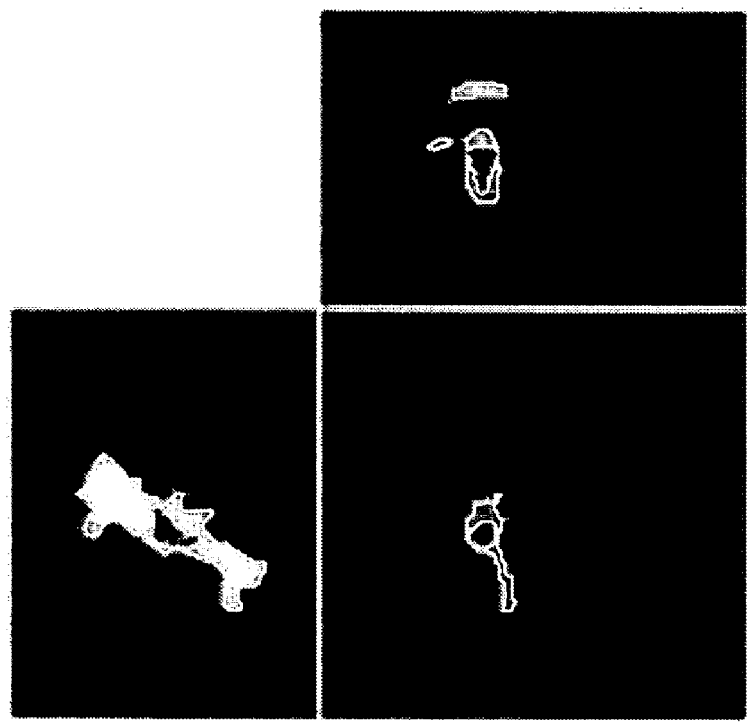
FIG. 5 is a drawing of an extracted object of interest according to an embodiment of the present disclosure.

In experiments, based on the property of CT images, it has been assumed that all the vessels are brighter than a threshold (ThreshIntensity) and other areas in the lung are darker than the threshold. As illustrated in FIG. 4, the extracted region 401 is growing in layers 402 (equal distance to the boundary of the candidate component) and stops if the vessel length is larger than a given value (MaxDistance). FIG. 5 shows a binary image in which the extracted vessel is shown in white. The black region inside the vessel is the PE component.

According to an embodiment of the present disclosure, in the vessel extraction process, a segment of the vessel is extracted alone with corresponding features and for example, stored as computer readable code, output to a display device, etc. However, the vessel segment can be as large as the whole vascular structure. The method for extracting the vessel presented here should be an illustrative embodiment. Other methods, for example, region growing, level set method among many others, can be used for extracting the vessel.

Referring to feature extraction 203, after vessel segmentation 202, texture features, histogram features, intensity features, difference features, and curvature features are extracted.

The texture features include texture features based on calculating the co-occurence matrix and texture features based on the discrete wavelet transform.

Histogram features include those having a most frequent gray value of the vessel.

The intensity features include the mean, median, standard deviation, minimum, maximum, skewness, and the curtosis of the gray values of the vessel segment.

Difference features include those having the difference between the mean value of the vessel and that of the candidate component, the difference between the most frequent gray value of the vessel and that of the candidate component.

Curvature features include the Gaussian curvature, mean curvature, the shape index, and the curvedness of the shell of the PE candidate While the texture features, histogram features, intensity features, difference features, and curvature features are representative, any number of different features can be extracted from the ROI indicated by the candidate and the extracted vessel. The extracted features can be implemented to verify the object of interest based on a comparison of the plurality of features to a known or expected set of features of one or more objects of interest (see FIG. 2, 205). The comparison may be used to eliminate FP candidates for objects of interest. These extracted features may be utilized by other modules, for example, a classifier, to identify the candidate as a true PE or a non-PE object, so as to eliminate the false positives and preserve the true positives.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 6:
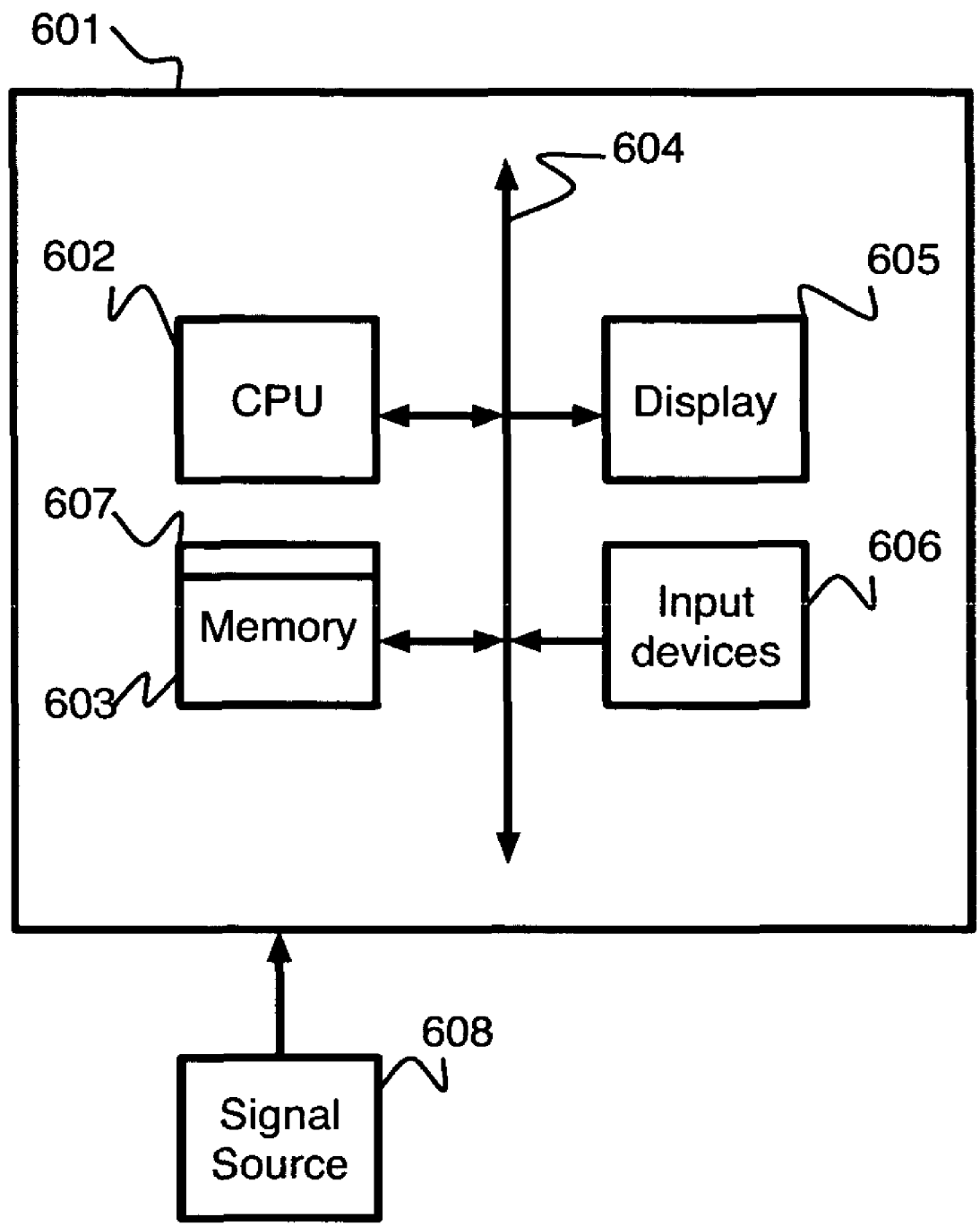
FIG. 6 is a drawing of a system according to an embodiment of the present disclosure.

Referring to FIG. 6, according to an embodiment of the present disclosure, a computer system 601 for object detection including a feature based approach for automatically removing the false positives can comprise, inter alia, a central processing unit (CPU) 602, a memory 603 and an input/output (I/O) interface 604. The computer system 601 is generally coupled through the interface 604 to a display 605 and various input devices 606 such as a mouse and keyboard. The support circuits can include circuits such as cache, power supplies, clock circuits, and a communications bus. The memory 603 can include random access memory (RAM), read only memory (ROM), disk drive, tape drive, etc., or a combination thereof. The present invention can be implemented as a routine 1007 that is stored in memory 603 and executed by the CPU 602 to process the signal from the signal source 608. As such, the computer system 601 is a general-purpose computer system that becomes a specific purpose computer system when executing the routine 607 of the present invention.

The computer platform 601 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present disclosure provided herein, one of ordinary skill in the related art will be able to contemplate these and similar implementations or configurations.

Having described embodiments for a system and method for object detection including a feature based approach for automatically removing the false positives, it is noted that modifications and variations can be made by persons skilled in the art in light of the above teachings. It is therefore to be understood that changes may be made in embodiments of the present disclosure that are within the scope and spirit thereof.

What is claimed is:

1. A computer-implemented method for automatically identifying a pulmonary embolism comprising:
acquiring input data including a digital or digitized medical image, the image comprising:
a vessel; and
a candidate in the vessel;
automatically extracting a boundary of the candidate;
automatically extracting a segment of the vessel containing the candidate, wherein extracting the segment of the vessel comprises seeding the segment extraction using the boundary, and growing the boundary;
automatically determining a plurality of features of the extracted segment of the vessel containing the candidate;
automatically identifying the candidate as a pulmonary embolism based upon the plurality of features of the extracted segment of the vessel including comparing the plurality of features to a known set of pulmonary embolism features and verifying the pulmonary embolism based on the comparison; and
automatically outputting data identifying the candidate as a pulmonary embolism and the plurality of features, wherein the data and the plurality of features are stored as computer-readable code.

2. The computer-implemented method of claim 1, wherein automatically extracting the segment of the vessel comprises providing the segment of the vessel having a fixed size.

3. The computer-implemented method of claim 1, wherein acquiring the input data comprises:
acquiring input data including a digital or digitized medical image, the image comprising the candidate as a plurality of voxels;

providing a value for stopping a region growing as a maximum distance between a voxel and the boundary of the candidate; and providing a threshold for an intensity of the voxel.

4. The computer-implemented method of claim 1, wherein automatically outputting further comprises classifying the candidate as a false positive or a true positive based on the plurality of features.

5. The computer-implemented method of claim 1, wherein the plurality of features includes a texture feature.

6. The computer-implemented method of claim 1, wherein the plurality of features includes a histogram feature.

7. The computer-implemented method of claim 1, wherein the plurality of features includes an intensity feature.

8. The computer-implemented method of claim 1, wherein the plurality of features includes a difference feature.

9. The computer-implemented method of claim 1, wherein the plurality of features includes a curvature feature.

10. A computer-implemented method for automatically identifying a pulmonary embolism in a digital or digitized medical image, comprising:

acquiring a digital or digitized medical image, the medical image including a vessel;

automatically identifying a candidate within the image;

automatically identifying a boundary of the candidate;

automatically segmenting the vessel, wherein segmenting the vessel comprises seeding the segmenting using the candidate boundary and growing the boundary;

automatically analyzing and determining a plurality of features of the segmented vessel; and automatically identifying the candidate as a pulmonary embolism based upon the plurality of features of the segmented vessel including comparing the plurality of features to a known set of pulmonary embolism features and verifying the pulmonary embolism based on the comparison.

11. The computer-implemented method of claim 10, wherein automatically segmenting the vessel comprises providing a segment of the vessel having a fixed size.

12. The computer-implemented method of claim 10, wherein acquiring the input data comprises:

acquiring input data including a digital or digitized medical image, the image comprising the candidate as a plurality of voxels;

providing a value for stopping a region growing as a maximum distance between a voxel and the boundary of the candidate; and providing a threshold for an intensity of the voxel.

13. The computer-implemented method of claim 10, wherein outputting the pulmonary embolism further comprises classifying the candidate as a false positive or a true positive based on the plurality of features.

14. The computer-implemented method of claim 10, wherein the plurality of features includes a texture feature.

15. The computer-implemented method of claim 10, wherein the plurality of features includes a histogram feature.

16. The computer-implemented method of claim 10, wherein the plurality of features includes an intensity feature.

17. The computer-implemented method of claim 10, wherein the plurality of features includes a difference feature.

18. The computer-implemented method of claim 10, wherein the plurality of features includes a curvature feature.

* * * * *